(12) United States Patent
Kang et al.

(10) Patent No.: US 7,979,623 B2
(45) Date of Patent: Jul. 12, 2011

(54) MULTI-CHANNEL INTEGRATED CIRCUIT CARD AND METHOD OF CONTROLLING THE SAME

(75) Inventors: Sang-Wook Kang, Yongin-si (KR); Sang-Bum Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 644 days.

(21) Appl. No.: 11/073,543

(22) Filed: Mar. 8, 2005

(65) Prior Publication Data

US 2005/0223143 A1   Oct. 6, 2005

(30) Foreign Application Priority Data

Apr. 1, 2004  (KR) .................. 10-2004-0022571

(51) Int. Cl.
*G06F 12/06* (2006.01)
(52) U.S. Cl. .................. 711/103; 711/167; 711/E12.078
(58) Field of Classification Search .................... 711/167
See application file for complete search history.

(56) References Cited

U.S. PATENT DOCUMENTS

| | | | | |
|---|---|---|---|---|
| 5,761,732 | A * | 6/1998 | Shaberman et al. | 711/157 |
| 5,847,372 | A | 12/1998 | Kreft | |
| 6,182,189 | B1 * | 1/2001 | Alexis et al. | 711/103 |
| 6,279,114 | B1 | 8/2001 | Toombs et al. | |
| 6,349,297 | B1 * | 2/2002 | Shaw et al. | 707/4 |
| 6,366,983 | B1 * | 4/2002 | Bains | 711/115 |
| 6,412,087 | B1 * | 6/2002 | Matsumoto | 714/738 |
| 6,609,163 | B1 * | 8/2003 | Nguyen et al. | 710/21 |
| 6,801,956 | B2 | 10/2004 | Feuser et al. | |
| 7,062,615 | B2 * | 6/2006 | Miller et al. | 711/152 |
| 2002/0053006 | A1 * | 5/2002 | Kawamoto et al. | 711/128 |
| 2002/0103944 | A1 | 8/2002 | Feuser et al. | |
| 2003/0084234 | A1 * | 5/2003 | Hang | 711/105 |
| 2004/0098543 | A1 * | 5/2004 | Araki et al. | 711/152 |
| 2005/0050283 | A1 * | 3/2005 | Miller et al. | 711/150 |

FOREIGN PATENT DOCUMENTS

| | | |
|---|---|---|
| DE | 10056592 | 5/2002 |
| EP | 0748485 | 2/1995 |
| FR | 2 680 262 | 2/1993 |
| JP | 6-60235 | 3/1994 |
| JP | 2003022216 A | 1/2003 |
| JP | 2003-123032 | 4/2003 |
| JP | 2003-281485 | 10/2003 |
| JP | 2004-503015 | 1/2004 |
| KR | 2003-005304 | 1/2003 |
| KR | 20-0316559 | 6/2003 |
| WO | WO 02/069127 | 9/2002 |

OTHER PUBLICATIONS

German Office Action dated Mar. 7, 2007. Office Action for corresponding German Application No. 10 2005 015 723.8-53 dated Nov. 20, 2006.
German Office Action dated May 18, 2006.
MultiMedia Card Specification (MMC), pp. 20, 21, 68 and 70, Version 4.0, Dec. 2003.

* cited by examiner

*Primary Examiner* — Matt Kim
*Assistant Examiner* — Ryan Dare
(74) *Attorney, Agent, or Firm* — Harness, Dickey & Pierce, P.L.C.

(57) ABSTRACT

A system and method for controlling a memory card are provided. The system may include a memory card and a host. The memory card may have a plurality of data transceiving channels, and the host may selectively activate the data transceiving channels in the memory card and transmit a plurality of commands to the activated data transceiving channels.

49 Claims, 5 Drawing Sheets

Fig. 5 though currently being performed. # MULTI-CHANNEL INTEGRATED CIRCUIT CARD AND METHOD OF CONTROLLING THE SAME This U.S. non-provisional patent application claims priority under 35 U.S.C. §119 to Korean Patent Application 2004-22571 filed on Apr. 1, 2004, the contents of which are incorporated by reference herein in their entirety.

BACKGROUND OF THE INVENTION

1. Field of the Invention

Example embodiments of the present invention relate generally to an integrated circuit card, more particularly, to an integrated circuit card with a flash memory.

2. Description of the Related Art

As portable digital devices, such as digital cameras, MP3 players, color mobile telephones, and personal digital assistants (PDA), are widely becoming popular, the demand for integrated circuit cards (e.g., memory cards), such as a multimedia card (hereinafter, referred to as MMC) and a secure digital (SD) card may be rapidly increasing. A memory card may be a storage device as small as a postage stamp with contents that may not be erased even without the supply of power. The relatively reduced size and excellent storage ability may be regarded as a required function in the information-oriented society.

A conventional MMC card may include a command line of, for example, 1 bit, and data lines of, for example, 8 bits. The MMC card may also write and/or read data in units of bytes in accordance with a command input from a host. However, according to the above specification, one MMC card may perform only one function and may not possible perform two functions while one function is performing. Further, even if two or more MMC cards are connected to an application, only one card at a time may actually transmit data to and receive data from the host. Therefore, even if plural MMC cards are connected, it may not be possible to simultaneously perform a plurality of functions.

The MMC card may require time that may be longer than the time required for common writing/reading operations in order to perform a secured function. That is, when a normal MMC operation is supported during the writing/reading operations, the secured function may not be guaranteed. Alternatively, when the normal MMC operation is not supported, a user may have to wait until the secured function is performed. Such a problem occurs in the SD card as well as in the MMC card.

SUMMARY OF THE INVENTION

Example embodiments of the present invention may provide an integrated circuit card system having a memory card and a host. The memory card may have a plurality of data transceiving channels and the host may selectively activate the data transceiving channels in the memory card and transmitting a plurality of commands to the activated data transceiving channels.

In example embodiments, the memory card may include a plurality of input pins receiving the plurality of commands from the host, an interface unit differentiating the plurality of commands by the channels, and a plurality of memory card controllers executing the commands through the plurality of channels. The memory card controllers being multi-accessed with the host through the plurality of channels.

In other example embodiments, the plurality of input pins may be defined by a specification of the memory card.

In other example embodiments, the memory card may include command pins, the command pins may be provided with as many of the activated channels.

In yet other example embodiments, the command pins may be selected from the plurality of input pins that are defined by the specification of the memory card.

In yet other example embodiments, the command pins may be selected from other than the plurality of input pins.

In other example embodiments, when two or more channels are activated, the memory card may include one or more second clock input pins that may be defined by the specification of the memory card so that the data transceiving operations of the respective channels are independently controlled, the second clock input pins may be other than a first clock input pin.

In yet other example embodiments, the second clock input pins may be selected from the plurality of input pins that are defined by the specification of the memory card.

In other example embodiments, the second clock input pins may be selected from other than the plurality of input pins.

In other example embodiments, the memory card may further comprise a memory core composed of a flash memory.

In other example embodiments, the memory card may be at least one of a multimedia card and a secure digital (SD) card.

Example embodiments of the present invention may provide a memory card. The memory card may include a memory core, a plurality of input pins receiving one or more commands from a host, and a memory card controlling device activating one or more data transceiving channels in response to the commands to transceive data for the host and storing the data transceiving results in the memory core.

Example embodiments of the present invention may provide a method of controlling an integrated circuit card system that performs a plurality of commands inputted from a host through a plurality of data transceiving channels. The method may include determining whether multi-channels are to be used, executing the plurality of commands through a single channel when it is determined that the multi-channels are not used, checking the number of channels when it is determined that the multi-channels are used, assigning command lines to the channels, determining data rates with respect to the channels, and executing the plurality of commands by the determined data channels.

In other example embodiments, the command lines may be assigned to the activated channels.

In other example embodiments, assigning the command lines may activate two or more channels.

In yet other example embodiments, when two or more channels are activated, further comprises assigning one or more second clock input pins other than a first clock input pin that is defined by the specification of the memory card so that the data transceiving operations of the respective channels is independently controlled.

Example embodiments of the present invention may provide a method of controlling a memory card. The method may include determining whether multi-channels are to be used, determining number of channels, setting command lines and data lines in accordance with the determined number of channels, and executing the plurality of commands by the determined data rates.

Example embodiments of the present invention may provide a multi-channel memory card that may include a plurality of data transceiving channels and a method of controlling the same.

Example embodiments of the present invention may provide a multi-channel memory card capable of simultaneously performing other functions than the function that is being performed while the memory card performs other functions and a method of controlling the same.

Example embodiments of the present invention may provide a multi-channel memory card capable of providing a multi-access function through multi-channels while being compatible with a memory card specification and a method of controlling the same.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention. In the drawings.

DETAILED DESCRIPTION OF EXAMPLE EMBODIMENTS

Example embodiments of the present invention will be described below in more detail with reference to the accompanying drawings. The present invention may, however, be embodied in different forms and should not be constructed as limited to the example embodiments set forth herein. Rather, these example embodiments are provided so that this disclosure will be thorough and complete; and will fully convey the scope of the invention to those skilled in the art. Like numerals refer to like elements throughout the specification.

A memory card according to an example embodiment of the present invention may activate one or more data transceiving channels in response to commands inputted from a host, and may transmit data to and receive data from the host through the respective activated data transceiving channels. As a result, a plurality of commands may be simultaneously performed by one memory card such that data processing efficiency may be improved.

Figure 1:
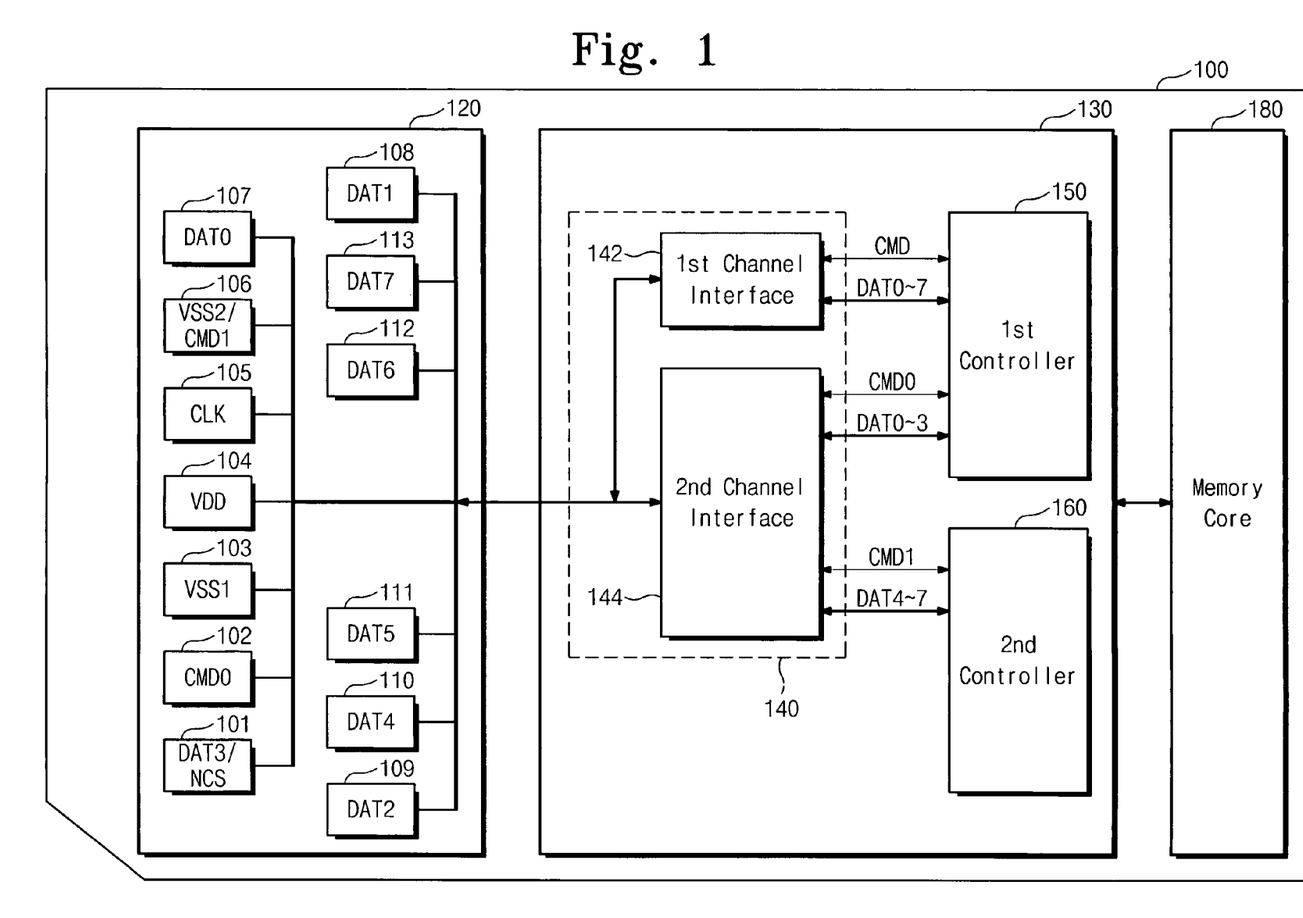
FIG. 1 is a block diagram of a two-channel memory card according to an example embodiment of the present invention.
Figure 2:
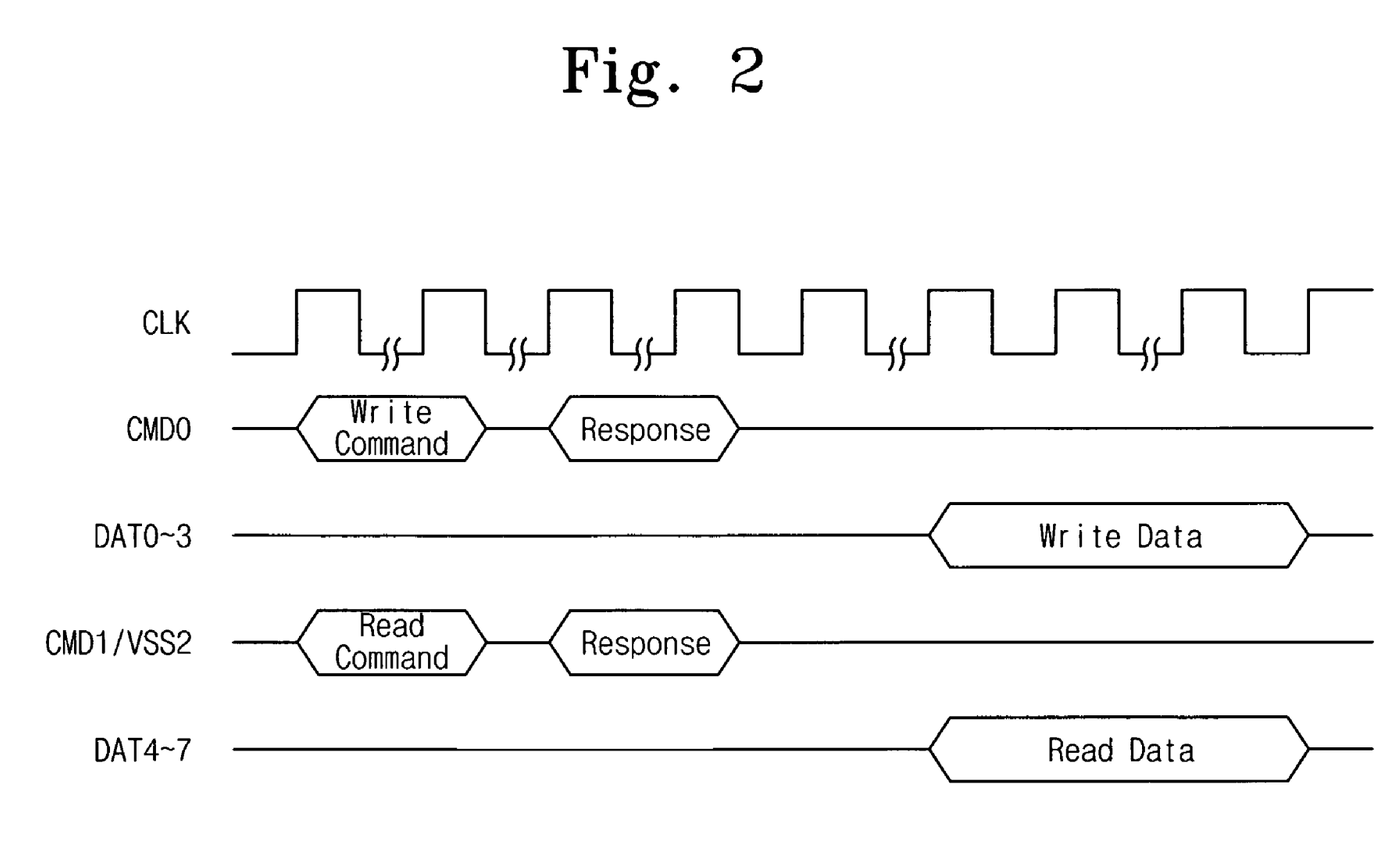
FIG. 2 is a timing diagram illustrating the two-channel multi-access operation of the memory card illustrated in FIG. 1.

FIG. 1 is a block diagram of a two-channel memory card 100 according to an example embodiment of the present invention. FIG. 2 is a timing diagram illustrating the two-channel multi-access operation of the memory card 100 illustrated in FIG. 1.

Referring to FIG. 1, the memory card 100 may include a plurality of input pins 120, a memory controller 130, and a memory core 180.

As an example embodiment, the plurality of input pins 120 may receive one or more commands and data items from the host through the respective pins 101 to 113. The memory controller 130 may activate two data transceiving channels in response to the commands inputted from the input pins 120, and may transmit data to and receive data from the host through the activated channels. In an example embodiment, the memory core 180 may be composed of a flash memory, and may store the results of the data transceiving operation performed by the memory controller 130.

The memory card 100 may transceive data through one channel in accordance with the communication method described herein. The memory card 100 may also simultaneously transceive data through two channels while being compatible with a conventional memory card. As a result, it may be possible to provide a multi-access function through multi-channels and improve the communication efficiency of the memory card while supporting the conventional memory card.

It should be appreciated that a 'channel' may indicate a data transceiving operation channel that may be composed of one or more command line and/or one or more data lines. Further, the operation may also conduct writing/reading operations that satisfy the memory card specification.

The structure of the input pins 120 in accordance with the memory card specification (i.e., the MMC card specification) and the structure of the input pins 120 according to an example embodiment of the present invention will be described below in TABLE 1.

TABLE 1

| | | MMC Mode (ver 4.0) | | | SPI Mode | | | 2-Channel MMC Mode | |
|---|---|---|---|---|---|---|---|---|---|
| Pin # | Name | Type | Describe | Name | Type | Describe | Name | Type | Describe |
| 1 | DAT3 | I/O/PP | Data | CS | I | Chip select | DAT3 | I/O/PP | Data |
| 2 | CMD | IO | Command/Response | DI | I | Data In | CMD0 | IO | Command1/Response1 |
| 3 | VSS1 | S | Ground | VSS1 | S | Ground | VSS | S | Ground |
| 4 | VDD | S | Power | VDD | S | Power | VDD | S | Power |
| 5 | CLK | I | Clock | CLK | I | Clock | CLK | I | Clock |
| 6 | VSS2 | S | Ground | VSS2 | S | Ground | CMD1 | IO | Command2/Response2 |
| 7 | DAT0 | I/O/PP | Data | DO | O | Data Out | DAT0 | I/O/PP | Data |
| 8 | DAT1 | I/O/PP | Data | | | Not used | DAT1 | I/O/PP | Data |
| 9 | DAT2 | I/O/PP | Data | | | Not used | DAT2 | I/O/PP | Data |
| 10 | DAT4 | I/O/PP | Data | | | Not used | DAT4 | I/O/PP | Data |
| 11 | DAT5 | I/O/PP | Data | | | Not used | DAT5 | I/O/PP | Data |
| 12 | DAT6 | I/O/PP | Data | | | Not used | DAT6 | I/O/PP | Data |
| 13 | DAT7 | I/O/PP | Data | | | Not used | DAT7 | I/O/PP | Data |

Referring to TABLE 1, the memory card 100 may include a ground pin VSS2 (e.g., defined as a second command pin other than a first command pin) which may be defined in the conventional memory card specification as two commands simultaneously received from the host. The number of channels and definition of the input pins 120 may be determined when the host initializes the memory card 100. The number of channels and definition of the input pins 120 may also be determined when the ground pin VSS2 is exclusively used as the second command pin while the host uses a single channel and/or two channels.

For example, when the memory card 100 uses one data transceiving channel, data items of 1, 4, or 8 bits may be transceived through a command line CMD of 1 bit and data lines DAT0 to 7 of 8 bits in accordance with the conventional memory card specification. Alternatively, when the memory card 100 uses two data transceiving channels such that the memory card 100 may use command lines CMD0 and CMD1 of 2 bits and data lines DAT0 to 3 and DAT4 to 7 of 8 bits, the two channels respectively may use a command line of 1 bit and data lines of 4 bits to simultaneously transceive data of 1 bit and/or data of 4 bits. Accordingly, because the data transceiving operation may be performed through the respective channels in accordance with the communication method defined in the memory card specification, it may be possible to simultaneously execute a plurality of commands by one memory card 100 as if a plurality of memory cards simultaneously operated.

The structure of the memory controller 130 that may transmit data and receive data from the respective channels will be described as follows.

The memory controller 130 may include an interface unit 140 for distinguishing a plurality of commands inputted from the input pins 120 by a plurality of channels. First and second controllers 150 and 160 may multi-access the host through the plurality of channels. The first and second controllers 150 and 160 may execute the respective commands provided to the respective channels and may write data in and may read data from the memory core 180 in accordance with the commands. The interface unit 140 may include a one-channel interfacer 142 and/or a two-channel interfacer 144. It should be appreciated that a multi-channel interfacer (e.g., more than two-channel) may also be employed.

In an example embodiment when the memory card 100 is used as a one-channel memory card, the one-channel interfacer 142 may transmit the commands and the data input from the input pins 120 to the first controller 150 through a command line CMD of 1 bit and data lines DAT0 to 7 of 8 bits. The one-channel interfacer 142 may also transmit the response signal (Response) and the data generated by the first controller 150 in accordance with the commands of the input pins 120 through the command line CMD and the data lines DAT0 to 7. The first controller 150 may transmit data of, for example, 1, 4, and/or 8 bits to and may receive data of, for example, 1, 4, and/or 8 bits from the host through the one-channel interfacer 142, and may store the data transceiving results in the memory core 180.

In another example embodiment when the memory card 100 is used as a two-channel memory card, the two-channel interfacer 144 may distinguish the commands and the data inputted from the input pins 120 by channels. The two-channel interfacer 144 may transmit the distinguished commands and data to the first controller 150 and the second controller 160 through first command lines CMD0 and CMD1 of 1 bit and data lines DAT0 to 3 and DAT4 to 7 of 4 bits, respectively. The first and second controllers 150 and 160 may transmit the response signal (Response) and the data to be transmitted to the host to the two-channel interfacer 144 through the command lines CMD0 and CMD1 and the data lines DAT0 to 3 and DAT4 to 7, respectively, so that the two-channel interfacer 144 may transmit the response signal (Response) and the data input from the first and second controllers 150 and 160 to the host. Thus, the two command lines CMD0 and CMD1 may share one clock line CLK to perform transceiving operation for data of 1 and/or 4 bits so that the data transceiving results may be stored in the memory core 180.

Referring to FIG. 2, when the host simultaneously writes data in the memory card 100 and reads data from the memory card 100, a write command and a read command may be transmitted to the first controller 150 and the second controller 160 through the first command line CMD0 and the second command line CMD1, respectively. The respective response signals (Response) generated by the first and second controllers 150 and 160 may be transmitted to the host through the first command line CMD0 and the second command line CMD1, respectively. Data to be written in the memory card 100 and data read from the memory card 100 may be transceived through the data lines DAT0 to 3 of 4 bits and the data lines DAT4 to 7 of 4 bits, respectively. As a result, the first and second controllers 150 and 160 may multi-access the host through two channels so that the channels may independently transceive data and simultaneously perform two or more functions by a single memory card 100.

As an example embodiment, the interface unit 140 may be composed of a channel multiplexer circuit that performs selection of signals with respect to the respective channels. However, it should be appreciated that other circuits may be employed. The interface unit 140 may be divided in accordance with the number of channels (e.g., the one-channel interfacer 142 and the two-channel interfacer 144) and may be composed of one circuit to interface with respect to one channel and/or two channels. Further, the interface unit 140 may interface with respect to the data transceiving operation of the one channel and/or the two channels.

Figure 3:
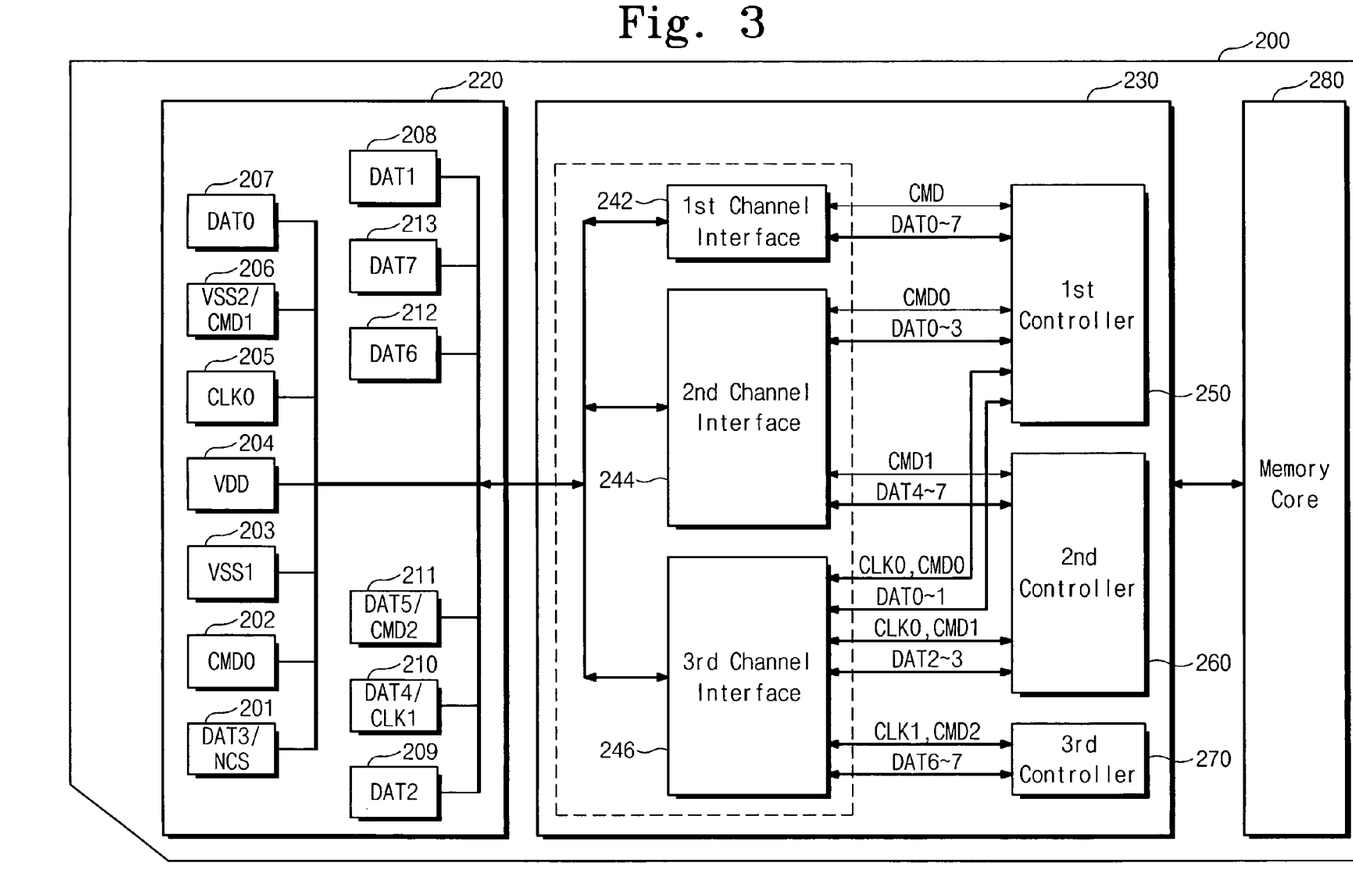
FIG. 3 is a block diagram of a three-channel memory card according to an example embodiment of the present invention.

FIG. 3 is a block diagram of a three-channel memory card 200 according to another example embodiment of the present invention. Referring to FIG. 3, the memory card 200 may transceive data through one channel in accordance with the communication method defined in the conventional memory card specification. The memory card 200 may also simultaneously transceive through two and/or three channels while being compatible with the conventional memory card specification. It should be appreciated by one skilled in the art that the memory card may also transceive data through more than three channels.

The circuit structure of the memory card 200 illustrated in FIG. 3 may be identical to the circuit structure of the memory card 100 illustrated in FIG. 2. However, the structure of the input pins 220 may be different from the structure of the input pins 120 of FIG. 2. Further, a three-channel interfacer 246 and a third controller 270 may be included in a memory controller 230 for data transceiving operation through three channels.

Therefore, for convenience sake, description of the redundant elements will be omitted.

TABLE 2

| Pin # | MMC Mode (ver 4.0) | | | SPI Mode | | | 3-Channel MMC Mode | | |
|---|---|---|---|---|---|---|---|---|---|
| | Name | Type | Describe | Name | Type | Describe | Name | Type | Describe |
| 1 | DAT3 | I/O/PP | Data | CS | I | Chip select | DAT3 | I/O/PP | Data |
| 2 | CMD | IO | Command/Response | DI | I | Data In | CMD0 | IO | Command0/Response0 |
| 3 | VSS1 | S | Ground | VSS1 | S | Ground | VSS | S | Ground |
| 4 | VDD | S | Power | VDD | S | Power | VDD | S | Power |
| 5 | CLK | I | Clock | CLK | I | Clock | CLK0 | I | Clock |
| 6 | VSS2 | S | Ground | VSS2 | S | Ground | CMD1 | IO | Command1/Response1 |
| 7 | DAT0 | I/O/PP | Data | DO | O | Data Out | DAT0 | I/O/PP | Data |
| 8 | DAT1 | I/O/PP | Data | | | Not used | DAT1 | I/O/PP | Data |
| 9 | DAT2 | I/O/PP | Data | | | Not used | DAT2 | I/O/PP | Data |
| 10 | DAT4 | I/O/PP | Data | | | Not used | CLK1/DAT4 | I/O/PP | Clock |
| 11 | DAT5 | I/O/PP | Data | | | Not used | CMD2/DAT5 | I/O/PP | Command2/Response2 |
| 12 | DAT6 | I/O/PP | Data | | | Not used | DAT6 | I/O/PP | Data |
| 13 | DAT7 | I/O/PP | Data | | | Not used | DAT7 | I/O/PP | Data |

Referring to TABLE 2, according to an example embodiment of the memory card 200, a ground pin VSS2 may be defined as a second command pin, which may be other than a first command pin as defined by a conventional memory card specification (i.e., a MMC card) so that two commands may be simultaneously received from the host. Further, among eight data pins 201 and 207 to 213, a fifth data pin DAT4 210 may be defined as a second clock input pin CLK1, and a sixth data pin DAT5 211 may be defined as a third command pin CMD2 so that three commands may be simultaneously received from the host. The second clock input pin CLK1 other than the conventional first clock input pin CLK may be defined to provide an independent interface with respect to the third command which may use a second clock.

The number of channels and definition of input pins 220 may be determined when the host initializes the memory card 200 (e.g., determine whether the ground pin VSS2 and the sixth and fifth data pins DAT5 and DAT4, respectively are exclusively used as the second and third command pins and the clock input pin according as the host may use a single channel and/or two or more channels).

In an example embodiment, when the memory card 200 uses one data transceiving channel, data items of 1, 4, and/or 8 bits may be transceived through the command line CMD of 1 bit and data lines DAT0 to 7 of 8 bits in accordance with the conventional memory card specification. In another example embodiment, when the memory card 200 uses two data transceiving channels, one of the two command lines CMD0 and CMD1 may simultaneously perform a function using the other command line CMD2 and data lines of at most 2 bits while performing one function using data lines of at most 4 bits. The two command lines CMD0 and CMD1 may simultaneously perform two functions using data lines of at most 4 bits, respectively. In another example embodiment, when the memory card 200 uses three data transceiving channels such that the memory card 200 may use command lines CMD0, CMD1, and CMD2 of 3 bits and data lines DAT0 to 1, DAT2 to 3, and DAT6 to 7 of 6 bits, the three channels may simultaneously transceive data of 1 or 2 bits using a command line of 1 bit and data lines of 2 bits, respectively. Because data may be transceived through the respective channels in accordance with the communication method defined in the conventional memory card specification, it may be possible to simultaneously execute a plurality of commands by one memory card 200 as if a plurality of memory cards simultaneously operated.

Figure 4:
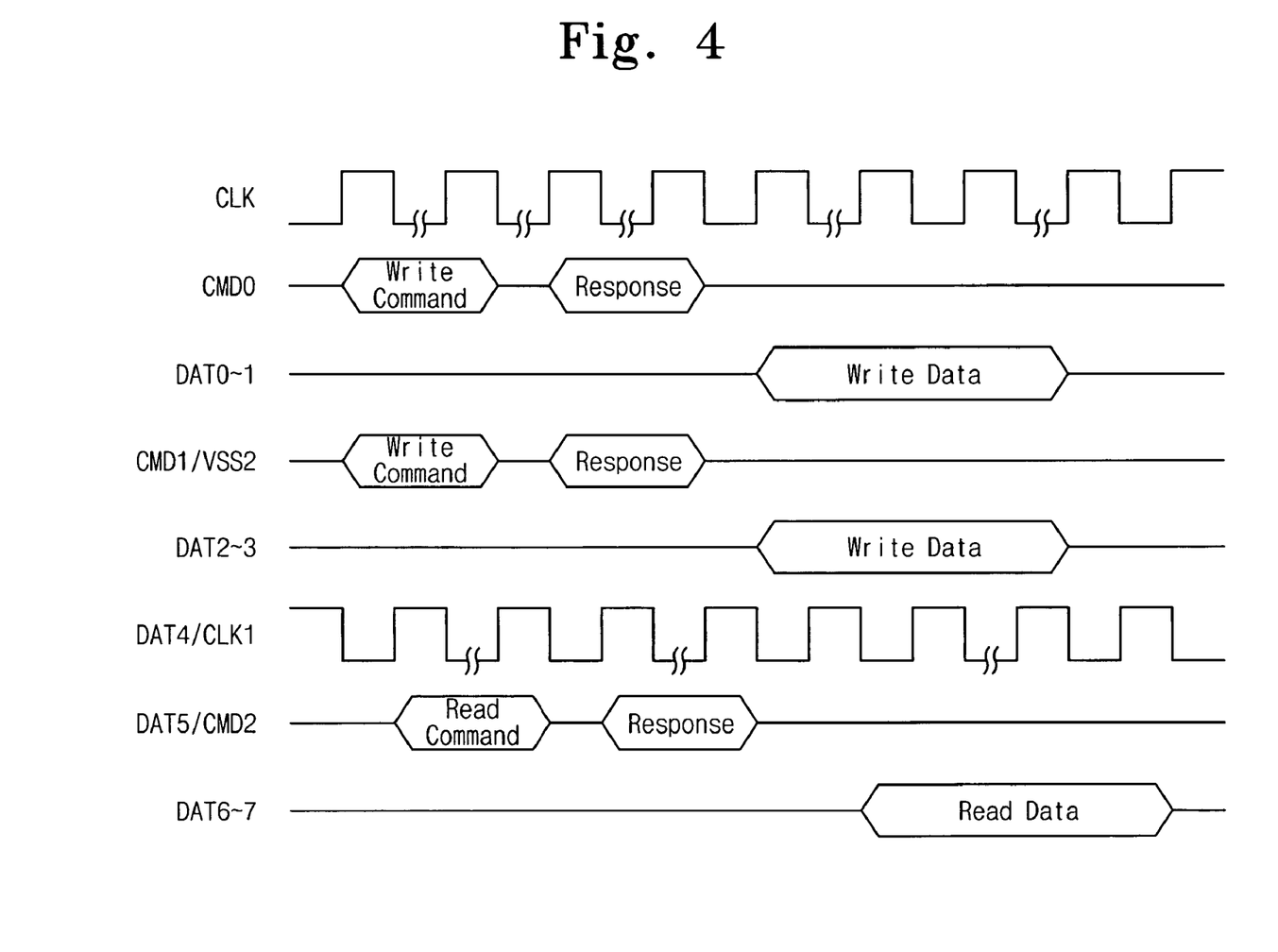
FIG. 4 is a timing diagram illustrating the three-channel multi-access operation of the memory card illustrated in FIG. 3.

FIG. 4 is a timing diagram illustrating the three-channel multi-access operation of the memory card 200 illustrated in FIG. 3.

Referring to FIG. 4, when the host simultaneously performs three operations of writing data in the memory card 200 through a first command line CMD0 and a second command line CMD1, and reading data from the memory card 200 through a third command line CMD2, a write command may be transmitted to a first controller 250 and a second controller 260 through the first command line CMD0 and the second command line CMD1, and a read command may be transmitted to a third controller 270 through the third command line CMD2. The respective response signals (Response) generated by the first and second controllers 250 and 260 may be transmitted to the host through the first command line CMD0 and the second command line CML1. The response signal (Response) generated by the third controller 270 may be transmitted to the host through the third command line CMD2. Subsequently, data to be written in the memory card 200 may be transmitted to the first and second controllers 250 and 260 through the data lines DAT0 and 1 of 2 bits and the data lines DAT2 and 3 of 2 bits, respectively. Data read from the memory card 200 may be transmitted to the host through the data lines DAT6 and 7 of 2 bits. As a result, the first to third controllers 250 to 270 may multi-access the host through the three channels so that the channels may independently transceive data.

Figure 5:
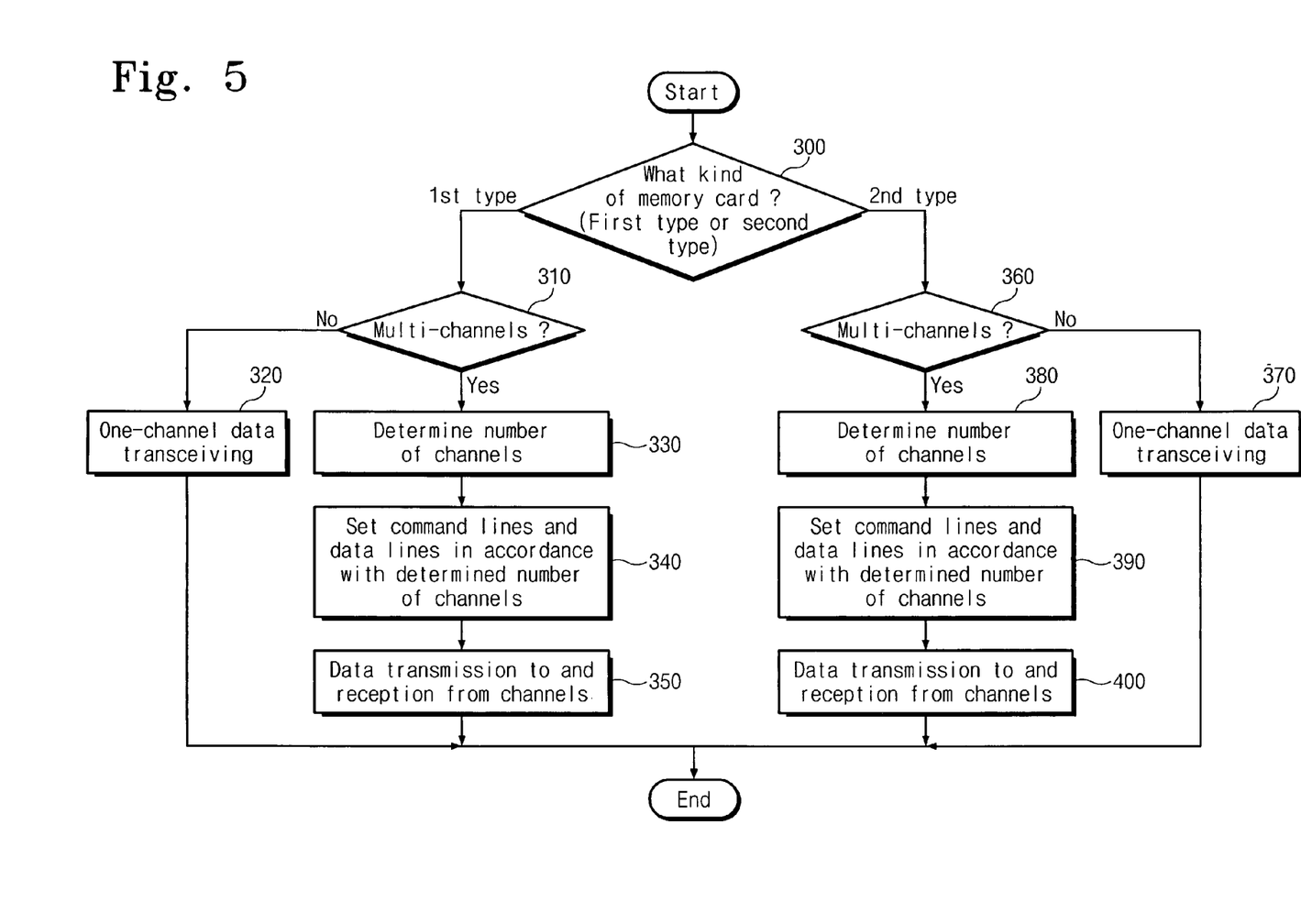
FIG. 5 is a flowchart illustrating a method of controlling a multi-channel memory card according to an example embodiment of the present invention.

FIG. 5 is a flowchart illustrating a method of controlling a multi-channel memory card according to an example embodiment of the present invention.

Referring to FIG. 5, according to the method of controlling a multi-channel memory card of the present invention, the operation may determine whether a memory card is a first type memory card or a second type memory card (300). In an example embodiment, the first and/or second type memory card may be a memory card with a flash memory, such as, for example a MMC card and a SD card.

If the operation determines that the memory card is the first type memory card (for example, the MMC card), then the operation may determine whether multi-channels are to be used (310). When it is determined in operation 310 that the multi-channels are not used, one-channel data transceiving operation defined by the specification of the first type memory card may be performed (320). In an example embodiment, when the first type memory card is a MMC card, data items of 1, 4, and/or 8 bits may be transceived as supported by the specification of the MMC card.

When it is determined in operation 310 that the multi-channels are used, the number of channels may be determined (330). In 340, command lines and data lines may be set in accordance with the number of channels determined in operation 330. Then, after determining the number of bits of data to be transmitted to and received from the respective channels, data may be transmitted to and received from the respective channels (350). At this time, when data is transceived through two channels, the respective channels may transceive data of 1 and/or 4 bits. When data is transceived through three channels, the respective channels may transceive data of 1 and/or 2 bits.

Alternatively, when it is determined in operation 300 that the memory card is a second type memory card (for example, a SD card), then the operation may determine whether the multi-channels are to be used (360). When it is determined in operation 360 that the multi-channels are not used, one-channel data transceiving operation defined by the specification of the second type memory card may be performed (370). In an example embodiment, when the second type memory card is the SD card, data items of 1, 2, and/or 4 bits may be transceived as supported by the specification of the SD card.

When it is determined in operation 360 that the multi-channels are used, the number of channels may be determined (380). In 390, command lines and data lines may be set in accordance with the number of channels determined in operation 380. Then, after determining the number of bits of data to be transmitted to and received from the respective channels, data may be transmitted to and received from the channels (400). At this time, when data is transceived through two channels, the respective channels may transceive data of 1 and/or 2 bits. When data is transceived through three channels, data of 1 bit may be transceived through the respective channels.

As described above, the multi-channel memory cards 100 and 200 according to example embodiments of the present invention may include command lines corresponding to the number of channels such that pluralities of commands are simultaneously executed. For example, when command lines of 2 bits are included (e.g., when two channels are included), the respective command lines may perform one function using data lines of at most 8 bits and/or simultaneously perform two functions using data lines of at most 4 bits, respectively.

In another example embodiment, when command lines of 3 bits are included (e.g., three channels are included), two command lines may simultaneously perform another function using the other command line and data lines of at most 2 bits while performing one function using data lines of at most 4 bits, respectively. The two command lines may simultaneously perform two functions using data lines of at most 4 bits, respectively. The three command lines may simultaneously perform three functions using data lines of at most 2 bits, respectively.

Further, according to the memory card of example embodiments of the present invention, one or more clock lines may be defined other than the clock line defined by the memory card specification so that data transceiving operations performed by the respective channels may be independently controlled (e.g., independent interfaces can be performed by the respective channels).

Further, example embodiments of the invention may describe definition of the respective input pins of the first type memory card (for example, a MMC card) and the second type memory card (for example, a SD card) having multi-channels and number of bits of data transmitted to the respective channels. Further, with respect to the definition of the functions of the respective input pins, the input pins provided by the conventional specification may be re-defined and additional pins may be further included.

According to the multi-channel memory card of the present invention, one or more data transceiving channels may be activated in response to the commands inputted from the host. Further, data may be transmitted to and received from the host through the respective activated data transceiving channels. As a result, it may be possible to process a plurality of commands using a single memory card so as to improve data processing efficiency.

Example embodiments of the present invention herein are described having a structure and operation of memory cards with multi-channels with two channels and/or three channels. However, it should be appreciated that memory cards may employ more than three channels. It should further be appreciated that the present invention may be applied to other memory cards that may use a flash memory such as, for example an SD card.

While this invention has been particularly shown and described with reference to an example embodiment thereof, it will be understood by those skilled in the art that various changes in form and details may be made therein without departing from the spirit and scope of the invention as defined by the appended claims.

What is claimed is:

1. An integrated circuit card system, comprising:
a host;
a memory core;
a plurality of input pins receiving a plurality of commands from the host;
a memory card controlling device communicating with the memory core via the plurality of pins;
wherein the memory card controlling device activates more than one data transceiving channels concurrently, transceives data through the activated data transceiving channels independently, and includes capabilities of performing two or more functions corresponding to the activated data transceiving channels simultaneously; and
wherein the memory card controlling device activates more than one data transceiving channels by dividing the plurality of input pins into input pin groups according to a number of activated transceiving channels, a number of the input pin groups depending on the number of the activated data transceiving channels, each of the input pin groups being assigned to a corresponding data transceiving channel of the activated data transceiving channels wherein the memory card diverts at least one data pin of the plurality of input pins into one of a power supply pin, a ground pin, a command pin and a clock pin when a number of the activated data transceiving channels increases.

2. The integrated circuit card system of claim 1, wherein a number of input pins in each input pin group decreases as the number of activated data transceiving channels increases.

3. The integrated circuit card system of claim 1, wherein the memory card further comprises:

an interface unit differentiating the plurality of commands to the activated data transceiving channels; and a plurality of memory card controllers executing the differentiated commands through the activated data transceiving channels, the plurality of memory card controllers being multi-accessed through the activated data transceiving channels.

4. The integrated circuit card system of claim 3, wherein the plurality of input pins are defined by a specification of the memory card.

5. The integrated circuit card system of claim 3, wherein the memory card further comprises a memory core, wherein the plurality of memory card controllers communicate with the memory core through a common channel.

6. The integrated circuit card system of claim 4, wherein the memory card comprises command pins provided with as many of the activated data transceiving channels.

7. The integrated circuit card system of claim 6, wherein the command pins are selected from the plurality of input pins that are defined by the specification of the memory card.

8. The integrated circuit card system of claim 7, wherein the command pins are selected from other than the plurality of input pins.

9. The integrated circuit card system of claim 4, wherein when two or more channels are activated, the memory card further comprises one or more second clock input pins that is defined by the specification of the memory card so that the data transceiving operations of the respective channels are independently controlled, the second clock input pins being other than a first clock input pin.

10. The integrated circuit card system of claim 9, wherein the second clock input pins are selected from the plurality of input pins that are defined by the specification of the memory card.

11. The integrated circuit card system of claim 10, wherein the second clock input pins are selected from other than the plurality of input pins.

12. The integrated circuit card system of claim 1, wherein the memory card further comprises a memory core composed of a flash memory.

13. A memory card, comprising:
a memory core;
a plurality of input pins; and
a memory card controlling device communicating with the memory core via the plurality of input pins, activating more than one data transceiving channels concurrently, and storing data transceiving results into the memory core,
wherein the memory card controlling device independently transceives data through the activated data transceiving channels and includes capabilities of simultaneously performing two or more functions corresponding to the activated data transceiving channels,
wherein the memory card controlling device activates more than one data transceiving channels by dividing the plurality of input pins into input pin groups according to a number of the activated transceiving channels, a number of the input pin groups depending on the number of the activated data transceiving channels, each of the input pin groups being assigned to a corresponding data transceiving channel of the activated data transceiving channels wherein the memory card controlling device diverts at least one data pin of the plurality of input pins into one of a power supply pin, a ground pin, a command pin and a clock pin when a number of the activated data transceiving channels increases.

14. The memory card of claim 13, wherein a number of input pins in each input pin group decreases as the number of activated data transceiving channels increases.

15. The memory card of claim 13, wherein the memory card controlling device further comprises:
an interface unit differentiating the plurality of commands by the channels; and
a plurality of memory card controllers executing the differentiated commands through the activated data transceiving channels, the plurality of memory card controllers being multi-accessed through the activated data transceiving channels.

16. The memory card of claim 15, wherein the plurality of memory card controllers communicate with the memory core through a common channel.

17. The memory card of claim 13, wherein the plurality of input pins are defined by a specification of the memory card.

18. The memory card of claim 17, wherein the memory card further comprises command pins provided with as many of the activated data transceiving channels.

19. The memory card of claim 18, wherein the command pins are selected from the plurality of input pins that are defined by the specification of the memory card.

20. The memory card of claim 17, wherein when two or more channels are activated, the memory card further comprises one or more second clock input pins that is defined by the specification of the memory card so that the data transceiving operations of the respective channels are independently controlled, the second clock input pins being other than a first clock input pin.

21. The memory card of claim 20, wherein the second clock input pins are selected from the plurality of input pins that are defined by the specification of the memory card.

22. The memory card of claim 13, wherein the memory core is a flash memory core.

23. A method of controlling an integrated circuit card system, comprising:
determining whether multi-channels are to be used;
executing a plurality of commands through a single channel when it is determined that the multi-channels are not used;
checking a number of channels when it is determined that the multi-channels are used;
activating the checked number of data transceiving channels concurrently; and
simultaneously executing at least two commands, corresponding to the activated data transceiving channels respectively, through the activated data transceiving channels,
wherein the activating the checked number of data transceiving channels includes:
assigning command lines to the determined multi-channels respectively;
determining data rates with respect to the determined multi-channels respectively;
dividing data lines into data line groups according to the determined checked number of channels, a number of the data line groups depending on the determined checked number of channels; and
assigning each of the data line groups to a corresponding channel of the determined multi-channels wherein at least one data line of the data lines is diverted into one of a power supply line, a ground line, a command line and a clock line when a number of the activated channels increases.

24. The method of claim 23, further comprises command pins selected from a plurality of input pins that are defined by a specification of the memory card.

25. The method of claim 24, wherein the command pins are selected from other than the plurality of input pins.

26. The method of claim 23, wherein assigning the command lines activate two or more channels.

27. The method of claim 26, wherein when two or more channels are activated, further comprises assigning one or more second clock input pins other than a first clock input pin that is defined by the specification of the memory card so that the data transceiving operations of the respective channels are independently controlled.

28. The method of claim 27, wherein the second clock input pins are selected from a plurality of input pins that are defined by a specification of the memory card.

29. The method of claim 28, wherein the second clock input pins are selected from other than the plurality of input pins.

30. The method of claim 23, further comprises differentiating whether the memory card is a first type memory card or a second type memory card prior to determining whether multi-channels are to be used,
wherein the method is carried out in accordance with the type of the memory card differentiated.

31. An integrated circuit card system operated according to claim 23.

32. The method of claim 23, further comprising:
communicating data transceived through the activated data transceiving channels with a memory core through a common channel.

33. The method of claim 23, wherein the integrated circuit card comprises a plurality of input pins, wherein lines including the command lines, the data lines and clock lines, which forms the plurality of data transceiving channels correspond to the plurality of input pins respectively.

34. The method of claim 23, wherein a number of data lines in each data line group decreases as the determined checked number of channels increases.

35. A method of controlling a memory card, comprising:
determining a number of channels;
activating the determined number of channels concurrently; and
independently transceiving data through the activated channels,
wherein at least two functions correspond to the activated channels respectively are performed simultaneously through the activated channels when multi-channels are activated,
wherein the activating the determined number of channels includes:
dividing data lines into data line groups according to the determined number of channels, a number of the data line groups depending on the determined number of channels;
assigning each of the data line groups to a corresponding channel of the determined channels; and
assigning command lines in accordance with the determined channels wherein at least one data line of the data lines is diverted into one of a power supply line, a ground line, a command line and a clock line when a number of the activated channels increases.

36. The method of claim 35, further comprises executing a plurality of commands inputted through a single channel when it is determined that multi-channels are not used.

37. The method of claim 35, further comprising determining data rates with respect to the determined multi-channels.

38. The method of claim 35, wherein the command lines are assigned to the activated multi-channels respectively.

39. The method of claim 35, wherein the memory card comprises command pins selected from a plurality of input pins that are defined by a specification of the memory card.

40. The method of claim 39, wherein the command pins are selected from other than the plurality of input pins.

41. The method of claim 35, wherein the command lines activate two or more channels.

42. The method of claim 41, wherein when two or more channels are activated, further comprising assigning one or more second clock input pins other than a first clock input pin that is defined by a specification of the memory card so that the data transceiving operations of the respective multi-channels are independently controlled.

43. The method of claim 42, wherein the second clock input pins are selected from a plurality of input pins that are defined by the specification of the memory card.

44. The method of claim 43, wherein the second clock input pins are selected from other than the plurality of input pins.

45. The method of claim 35, further comprises differentiating whether the memory card is a first type memory card or a second type memory card prior to determining whether multi-channels are to be used,
wherein the method is carried out in accordance with the type of the memory card differentiated.

46. An integrated circuit card system including the memory card according to claim 35.

47. The method of claim 35, further comprising:
communicating data transceived through the activated data transceiving channels with a memory core through a common channel.

48. The method of claim 35, wherein the integrated circuit card comprises a plurality of input pins, wherein lines including the command lines, the data lines and clock lines, which forms the plurality of data transceiving channels correspond to the plurality of input pins respectively.

49. The method of claim 35, wherein a number of data lines in each data line group decreases as the determined number of channels increases.

* * * * *